Patented Aug. 23, 1949

2,479,636

UNITED STATES PATENT OFFICE 2,479,636

PRODUCTION OF CADMIUM RED PIGMENTS

Ludwig F. Nerlinger, Marshallton, Del., assignor to E. I. du Pont de Nemours & Company, Wilmington, Del., a corporation of Delaware No Drawing. Application October 11, 1945, Serial No. 621,858

7 Claims. (Cl. 106—301)

This invention relates to novel and improved cadmium red pigments and to new and improved methods for manufacturing such pigments.

Cadmium red pigments comprise well-known commercial products, being employed in the production of paints, vitreous enamels, and in other uses. These red pigments contain cadmium, sulphur, and selenium, and their color depends upon the method which is used in their manufacture, as well as the variation in composition and ingredients of the final product.

The conventional cadmium red pigment offered to the paint trade is usually obtained by coprecipitating cadmium sulpho-selenide and barium sulphate through the admixture of solutions of barium sulpho-selenide and cadmium sulphate. The resulting pigment is then calcined to develop its pigment properties and is usually called a cadmium red lithopone. Similar pigments containing no barium sulphate may be made by substituting cadmium chloride for cadmium sulphate or sodium sulphide for barium sulphide. In such cases the pigment slurry will contain soluble salts as the precipitate is formed which may be removed before calcination.

Cadmium red pigments have also been produced by calcining a cadmium compound, such as the sulphide, the oxide, or the carbonate, with selenium or a mixture of selenium and sulphur. Part of the sulphur and selenium become volatilized during the reaction and hence the process consumes considerable amounts of selenium due to vapor losses. The product thus produced is used especially by the ceramic industry as a pigmenting or coloring agent for glasses and enamels.

A third proposed method involves the reaction of cadmium sulphate with a solution of selenium in an alkali metal sulphite. The selenium solution thus obtained contains an alkali metal seleno-sulphate which reacts with a cadmium salt to give cadmium selenide. This latter is then calcined with cadmium sulphide or with sulphur to provide a cadmium red pigment.

All of these prior processes require relatively large amounts of selenium to produce a desired color and any saving in the amount of selenium is highly important because of the high cost of this element, the most expensive ingredient used in the process. Additionally, optimum particle size is not readily obtained in such processes, and as a result a product is obtained the tinting strength and other pigment properties of which are below the maximum attainable.

This invention has as an object the provision of a new process for overcoming these disadvantages in prior cadmium red pigment production and to provide a novel method for preparing high-quality cadmium red pigments. A further object is to provide a process for the preparation of a valuable, improved red pigment by the calcination of a selenium-containing cadmium precipitate in the presence of other materials which contain cadmium or cadmium and sulphur. A still further object is to provide a process which will eliminate loss of substantial amounts of selenium during the calcination treatment, with consequent resulting economies. Other and further objects will be evident from the ensuing description of my invention.

These and other objects are accomplished by the present invention, which involves the preparation of a cadmium seleno-cyanide compound and subsequently calcining the same in the presence of added cadmium or cadmium and sulphur to obtain the desired cadmium red pigment.

In a more specific and preferred embodiment, precipitated cadmium seleno-cyanide

$$(Cd(SeCN)_2)$$

is mixed with a cadmium sulphide precipitate and the resulting mixture is then calcined to obtain the desired high-quality cadmium red product.

In practicing the invention in accordance with such preferred embodiment, I first prepare cadmium seleno-cyanide $(Cd(SeCN)_2)$ in accordance with the methods disclosed in my copending, concurrently-filed application Serial No. 621,857, now matured into Patent No. 2,419,027, by dissolving selenium in an inorganic cyanide salt solution and then reacting the seleno-cyanide salt solution which results with a solution of a cadmium salt. A cadmium seleno-cyanide precipitate is obtained which analyzes about 35% cadmium and about 49% selenium. Selenium is readily soluble in solutions of inorganic cyanides, and particularly those of the alkali metals (sodium, potassium, lithium). It also dissolves in other cyanides, particularly those of the alkaline earth metals (calcium, barium, or strontium). Of these, sodium cyanide is preferred for use because it is commercially most attractive and least expensive. Calcium cyanide, though utilizable, is not recommended for employment when using cadmium sulfate solution, because calcium sulfate precipitates. In such instances, sulfate precipitation may be avoided by employing cadmium chloride. The Se:Cn ratio of the reagents appears to be fairly constant for all cyanide concentrations up to saturation. When the solution is prepared at room temperatures, the solubility of selenium is measurably greater; e. g., Se:KCN ratio=.97 at room temperature; .91 with boiling KCN. A slight excess of Se may be desirable, as the $Cd(SeCN)_2$ subsequently to be formed is somewhat soluble in excess CN. A preferred concentration of the reagent has been found to be 747 grams of elemental selenium dissolved at room temperature in one liter of NaCN solution containing about 480 grams of NaCN (Se:NaCN ratio=.993).

The seleno-cyanide solution thus prepared is then reacted with a solution of a cadmium salt, such as the sulfate, chloride, or nitrate. The resulting white precipitate is recovered by filtration, washed and dried. In order to effect the greatest saving of selenium, it is important to react the cadmium solution with the alkali selenocyanide solution at ratios of not less than 1 mol of cadmium to 2 mols of selenium. Indeed, an excess of $CdSO_4$ is preferred, due to the solubility of $Cd(SeCN)_2$ in solutions of cyanides and selenocyanides. For the same reason, the minimum dilution of the reactants is recommended, only enough water being preferably used as will allow easy agitation.

In preparing the desired cadmium red pigment and using the preferred compound $Cd(SeCN)_2$ as the source of selenium, various methods can be employed:

(a) In producing unextended cadmium sulphoselenides, cadmium oxide or cadmium carbonate, sulphur (or cadmium sulfide), and $Cd(SeCN)_2$ are wet or dry blended, the sulphur being in slight excess. The proportion of $Cd(SeCN)_2$ used can be suitably varied, depending upon the shade of red desired; i. e., the lighter the shade, the less the required amount of selenium. The resulting mixture is then calcined at temperatures ranging from about 500° C. to about 900° C., but preferably at temperatures between 625° C. and 725° C., using a neutral or reducing atmosphere during the calcination. The calcined product is then cooled by either wet or dry quenching, and is finished in accordance with conventional pigment-finishing operations.

(b) To prepare red lithopones, a similar process to that just described may be used. Thus, a regular cadmium yellow lithopone strike is made in accordance with the equation:

$$BaS + CdSO_4 = CdS + BaSO_4$$

Pre-formed $Cd(SeCN)_2$ is then blended therewith or precipitated directly thereon by reacting cadmium sulfate with an equivalent amount of solution of selenium in sodium cyanide in the presence of the suspension of lithopone, in accordance with the equation: 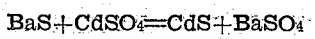. The resulting precipitate comprises a three-component mixture of cadmium sulfide, cadmium seleno-cyanide, and barium sulfate; the amount of $Cd(SeCN)_2$ used again determining the shade of red. The resulting blend is then filtered to remove excess water, following which it is calcined under the same conditions as already mentioned for the sulphoselenides. The calcined product is quenched and finished in any desired manner, as by grinding, to effect desired fineness.

As indicated in the above-described procedures, the conditions of calcination are critical and important in the invention. Presumably, $Cd(SeCN)_2$ is partially decomposed at elevated temperatures in presence of water vapor, yielding cadmium selenide (or sulphoselenide where sulphur is present), ammonia, and CO or $CO_2$. The amount of heat affects the shade of the resultant pigment; i. e., at low temperatures the red is dirtied with brown. The higher the temperature the clearer the shade, to a maximum of roughly 625° C. to 725° C. Beyond that, the color may continue good but pigment strength tends to decrease. The type of atmosphere in the calcination chamber may also injure the shade. In an oxidizing atmosphere CdO may form, thus giving a brownish tinge to the pigment. Hence, a neutral or reducing atmosphere is desirable and preferred. Steam has been found sufficient for this, one simple and satisfactory method for accomplishing this being to add the blend to the calciner as a wet press cake. In this event, steam is generated during the heating.

The method of "quenching," or cooling, the hot pigment also should so be designed as to avoid excessive oxidation. This is preferably effected by cooling quickly, as by plunging the calcined pigment mass into water. Simply cooling in air in a covered vessel also can be resorted to, since it is harmless to color.

The following illustrative examples are given of certain specific embodiments of the invention, none of which are to be construed as limiting its scope:

*Example I*

One liter of $CdSO_4$ solution containing 440 grams of $CdSO_4$ was reacted with 1.79 liters of barium sulphide liquor containing 200 grams BaS per liter to yield a precipitate of raw cadmium yellow lithopone. To this slurry were added 264 cc. of a $CdSO_4$ solution containing 116 grams $CdSO_4$ and 164 cc. of NaSeCN solution containing 81.3 grams selenium and 50.4 grams NaCN, thereby precipitating $Cd(SeCN)_2$ on the raw cadmium yellow lithopone. The resultant slurry was filtered and the wet cake placed in a small rotary calciner. The temperature was raised to 650° C. in 40 minutes and held there for 15 minutes. The hot discharge was quenched in water, pebble milled, filtered and washed to remove soluble $Na_2SO_4$, dried, and pulverized. A soft, light-red powder resulted. This was compared with a standard commercial cadmium lithopone of matching shade, made by a prior art process by striking $CdSO_4$ with a solution of Se and BaS. My sample was found to be a brighter and clearer red than the prior art sample. Assuming that a full 100% of the added selenium was retained in the new material (actually, of course, an improbable figure), the selenium content of the prior art sample possessing an equal color was still 12% greater. This does not take into account the large quantity of selenium added initially to the prior art sample and subsequently lost during calcination. Thus the efficiency of this element is very greatly improved by the new process.

*Example II*

A solution of NaSeCN containing 500 grams selenium per liter was reacted with a slight excess of a $CdSO_4$ solution containing 2 lbs. Cd per gallon. A white $Cd(SeCN)_2$ precipitate formed, analyzing about 32.7% Cd and 44.5% Se. 33.1 parts by weight of this $Cd(SeCN)_2$ were mixed with 66.2 parts of CdO and 16.5 parts of elemental sulphur, plus enough water for easy agitation. The wet blend was filtered and the cake dried. The material was then placed in a rotary kiln through which steam was circulated. The kiln was heated to 650° C. over a period of 4 hours and held there for 15 minutes. The hot discharge was allowed to cool in a covered container and was pulverized to yield 100 parts by weight of a dark red cadmium sulphoselenide pigment. It was then compared with a regular commercial grade of matching shade prepared by the prior art method of co-calcining CdO, sulphur and selenium. The commercial process had used 30.8 lbs. of selenium per 100 lbs. product, retaining only 15.8 lbs. in the finished pigment. In the present method, using $Cd(SeCN)_2$, only 14.7 lbs. selenium were added initially. Thus, for an equal shade of red, selenium efficiency was more than doubled.

The use of cadmium selenocyanide in cadmium reds manufacture has many advantages, some of which already have been alluded to. Thus, (1) pigments produced from it are equal to, or in many cases brighter and clearer than, prior art products. (2) At the same time large savings in the most expensive constituent, selenium, are made possible. (3) Former methods require rigid control of the calcination atmosphere and prevention of any exposure of the pigment to oxidation during quenching. As already indicated, the maintenance of a neutral or reducing atmosphere in the calciner, and a minimum of exposure to air during quenching are also desirable in the present invention. However, $Cd(SeCN)_2$ is not as sensitive to oxidation as the various compounds previously used. Consequently, this method is more flexible and markedly simpler. (4) In sulphoselenide production, only a small excess of sulphur is necessary, whereas previously large quantities had to be used. Thus, another reduction in cost is afforded. (5) The present invention and method allows easy and essentially full use of selenium and cadmium.

As stated, my process is useful in the production of red cadmium pigments, the shade of which may vary greatly and as desired, depending on the amount of cadmium seleno-cyanide used in the operation. This reagent supplies the selenium and contains two atoms of selenium for each atom of cadmium. Upon calcination, the compound is believed to decompose with the generation of gases containing carbon and nitrogen. In the presence of cadmium sulphite or a composition which will give cadmium sulphide upon calcination (such as a mixture of cadmium oxide and sulphur) one is enabled to produce a composition comprising cadmium, selenium and sulphur, commonly known as a cadmium sulphoselenide pigment or cadmium red pigment. The selenium content determines in large measure its shade, and when the selenium content varies from 0–20% the color will vary from yellow to reddish-orange to light red to dark red, and at the high concentration will be a maroon.

The process may be used to produce either an extended red pigment containing barium sulphate or a non-extended pigment in which the composition is made up of the elements cadmium, sulphur and selenium in the absence of substantial amounts of inert fillers, such as barium sulphate or its equivalent calcium or strontium sulphates.

All variations of this process make use of cadmium selenocyanide as a source of selenium and this is calcined in the presence of a sulphur-bearing material which may be either free sulphur or cadmium sulphide. It is preferable to use less cadmium in the form of the selenocyanide than is supplied from cadmium oxide, sulphide or carbonate. This is due to the fact that the selenocyanide contains two atoms of selenium for each atom of cadmium and is thereby free to supply selenium to cadmium which is added as another compound. This precaution is taken to conserve selenium so that it will not be volatilized during calcination, but, on the other hand, will be combined with cadmium to give the active color-imparting compound. The cadmium content of cadmium sulphide, of cadmium oxide, and of cadmium carbonate and their equivalents is defined herein as "reactive cadmium," due to the fact that the cadmium is free to yield a sulphide or a selenide upon calcination. Sulphur present as free sulphur or as cadmium sulphide is defined as "reactive sulphur" since it will be found as a sulphide in the calcined product. Also, the composition containing reactive cadmium and reactive sulphur when calcined with cadmium selenocyanide must yield cadmium sulphide on calcination in the absence of cadmium selenocyanide. Cadmium sulphide meets this requirement as it remains in the calcined product as the sulphide. Mixtures of cadmium oxide and sulphur as well as cadmium carbonate and sulphur give cadmium sulphide upon calcination. It is essential that the active ingredients other than cadmium selenocyanide used in the process must yield cadmium sulphide when calcined alone or when calcined in the presence of cadmium selenocyanide.

I claim as my invention:

1. A process for producing a cadmium sulphoselenide pigment which comprises calcining in a non-oxidizing atmosphere, and at temperatures ranging from about 500–900° C., cadmium selenocyanide in the presence of added sulfur and a cadmium compound.

2. A process for the manufacture of a cadmium sulpho-selenide pigment which comprises decomposing cadmium seleno-cyanide by calcination in a non-oxidizing atmosphere and at a temperature ranging from 625–725° C. in the presence of added sulfur and a cadmium compound.

3. A process for the manufacture of a cadmium sulpho-selenide pigment which comprises calcining, in a non-oxidizing atmosphere and at a temperature ranging from 625–725° C., cadmium seleno-cyanide in the presence of a cadmium compound and sulphur, employing said ingredients in sufficient proportion to produce a cadmium sulpho-selenide pigment, quenching the calcined pigment to effect quick cooling thereof, and pulverizing the resulting product to pigment fineness.

4. A process for the manufacture of a cadmium sulpho-selenide pigment which comprises calcining in a non-oxidizing atmosphere and at temperatures ranging from 625–725° C. a mixture of cadmium seleno-cyanide, cadmium oxide and sulphur, employing said ingredients in sufficient proportion in said mixture to produce a cadmium sulpho-selenide pigment, quickly cooling the calcined product and pulverizing the same to desired pigment fineness.

5. A process for the manufacture of a cadmium sulpho-selenide pigment which comprises calcining in a non-oxidizing atmosphere and at temperatures ranging from 625° C. to 725° C. a mixture of cadmium seleno-cyanide, cadmium carbonate, and sulphur, employing said ingredients in sufficient proportion in said mixture to produce a cadmium sulpho-selenide pigment, quickly cooling the calcined product and pulverizing the same to desired pigment fineness.

6. A process for the manufacture of a cadmium sulpho-selenide pigment which comprises calcining in a non-oxidizing atmosphere and at temperatures ranging from 625–725° C. a mixture of cadmium seleno-cyanide and cadmium sulphide, employing said ingredients in sufficient proportion in said mixture to produce a cadmium sulpho-selenide pigment, quenching the calcined product to effect quick cooling thereof, and then pulverizing it to pigment fineness.

7. A process for the manufacture of a cadmium sulpho-selenide pigment which comprises calcining, in a non-oxidizing atmosphere and at a temperature ranging from 625–725° C., a mixture of cadmium seleno-cyanide, cadmium sulfide and barium sulfate, employing said ingredients in sufficient proportions to produce a cadmium sulpho-selenide pigment, cooling the calcined product and then pulverizing it to pigment fineness.

LUDWIG F. NERLINGER.

REFERENCES CITED

The following references are of record in the file of this patent:

Ser. No. 350,065, Loeffler (A. P. C.) pub. May 11, 1943.

OTHER REFERENCES

Mattiello, "Protective and Decorative Coatings," vol. II, pages 18 and 19.

Certificate of Correction

Patent No. 2,479,636

August 23, 1949

LUDWIG F. NERLINGER

It is hereby certified that errors appear in the printed specification of the above numbered patent requiring correction as follows:

Column 5, line 48, for "sulphite" read *sulphide*; column 6, line 35, and line 41, after the word "compound" and before the period insert , *said cadmium seleno-cyanide, sulphur and cadmium compound ingredients being in sufficient proportion to produce a cadmium sulpho-selenide pigment*; lines 37 and 38, for "decomposing" read *calcining*; line 38, after "seleno-cyanide" strike out *by calcination*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*